(12) United States Patent
Ebert

(10) Patent No.: US 7,974,958 B2
(45) Date of Patent: Jul. 5, 2011

(54) METHOD, APPARATUS AND SYSTEM FOR CONFIGURATION-DEPENDENT CONTROL OF FURNISHING INFORMATION

(75) Inventor: Rüdiger Ebert, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 633 days.

(21) Appl. No.: 11/796,311

(22) Filed: Apr. 27, 2007

(65) Prior Publication Data

US 2007/0288528 A1    Dec. 13, 2007

(30) Foreign Application Priority Data

May 5, 2006 (DE) .......................... 10 2006 021 048

(51) Int. Cl.
*G06F 7/00* (2006.01)
*G06F 17/00* (2006.01)
*G06F 12/00* (2006.01)
*G06F 17/30* (2006.01)

(52) U.S. Cl. .................... 707/694; 707/695; 707/825

(58) Field of Classification Search .................. 707/100, 707/101, 104.1, 200, 201, 203, 687, 694, 707/695, 792, 796, 821, 825
See application file for complete search history.

(56) References Cited

U.S. PATENT DOCUMENTS

| | | | | |
|---|---|---|---|---|
| 6,088,665 A * | 7/2000 | Burns et al. | ................... | 702/188 |
| 6,366,919 B2 * | 4/2002 | O'Kane et al. | ................ | 707/101 |
| 6,810,406 B2 * | 10/2004 | Schlabach et al. | ............ | 707/201 |
| 7,209,817 B2 * | 4/2007 | Abdel-Malek et al. | ......... | 701/33 |
| 7,370,229 B2 * | 5/2008 | Ohno et al. | ........................ | 714/6 |
| 7,584,165 B2 * | 9/2009 | Buchan | ........................ | 706/60 |
| 2002/0087578 A1 * | 7/2002 | Vroman | ..................... | 707/104.1 |
| 2005/0187838 A1 * | 8/2005 | Squeglia et al. | ................ | 705/29 |
| 2007/0100892 A1 * | 5/2007 | Kephart et al. | ............... | 707/200 |
| 2008/0275971 A1 * | 11/2008 | Pretlove et al. | ................ | 709/222 |

FOREIGN PATENT DOCUMENTS

WO    WO 02/077732 A1    10/2002

* cited by examiner

*Primary Examiner* — Don Wong
*Assistant Examiner* — Merilyn P Nguyen
(74) *Attorney, Agent, or Firm* — Lempia Summerfield Katz LLC

(57) ABSTRACT

A method and apparatus for updating technical data sets that perform maintenance processes in technical systems is provided. The technical systems include a plurality of components that can each be configured dynamically. After a change in configuration of a component is detected, a report is sent by a configuration database to a central management system. The current management system provides the current version of the technical data sets to a document server.

16 Claims, 1 Drawing Sheet

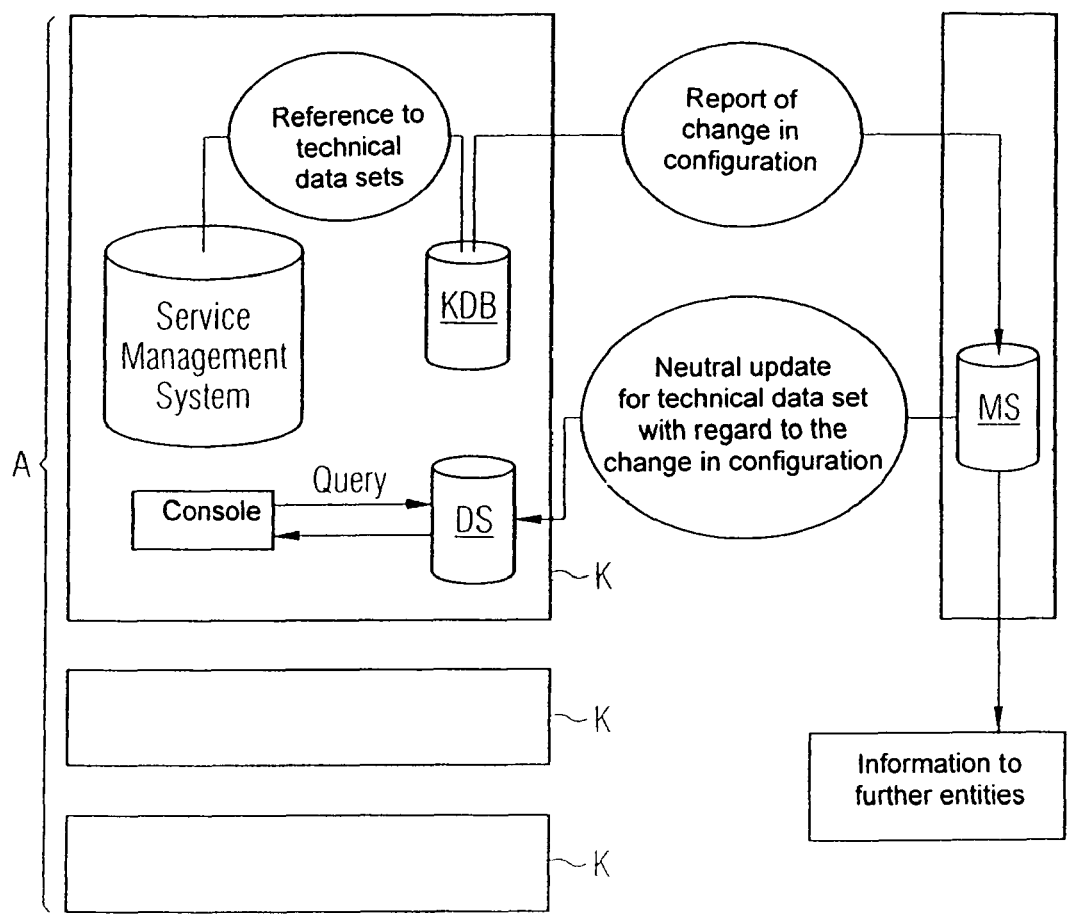

METHOD, APPARATUS AND SYSTEM FOR CONFIGURATION-DEPENDENT CONTROL OF FURNISHING INFORMATION

The present patent document claims the benefit of the filing date of DE 10 2006 021 048.4 filed May 5, 2006, which is hereby incorporated by reference.

BACKGROUND

The present embodiments are in the field of maintenance, startup, and monitoring, and upkeep of large-scale technical systems, such as medical and aircraft systems, process systems, or other systems that comprise many dynamically configurable components and may be subject to constant revision.

The present embodiments relate to a method for controlling the furnishing of technical data sets for performing maintenance processes in large-scale technical systems that include many dynamically configurable components.

In the operation of large-scale technical systems, such as medical and aircraft systems, technical documentation is necessary for performing maintenance tasks. Maintenance tasks may include constant monitoring, installation processes, maintenance processes, updates of individual components, or other revision provisions. Technical documentation is a complex task because the system comprises a plurality of components that are subject to constant expansion and change. Change in a single component affects the maintenance of the entire system. For example, if a single component of a system is configured only slightly differently, this already makes it necessary to have different technical data sets for performing the maintenance task. Depending on the size of the system, the technical data sets may become quite extensive and need to be updated constantly.

The most current technical data sets at the time should be used for performing the maintenance task. If outdated data sets are used, either major errors can occur, or there is the risk that the maintenance task will miss the mark. There are many technical data sets that are relevant to performing these maintenance processes. The various technical data sets should be correctly allocated to a suitably configured system. Controlling the correct allocation involves stringent demands.

Each system is defined by the number, type, and/or configuration, as well as by other parameters pertaining to its various components. Controlling the correct allocation of data sets is highly vulnerable to error.

Conventionally, the technical data sets for performing such maintenance processes were made available in paper form or also on electric media.—Any change with respect to the system or its components, required all the technical data sets, or parts of them, to be replaced. Alternatively, new electronic media (for instance in the form of a portable data holder such as a CD and so forth) had to be created and distributed. The manual procedure was also based on a manual allocation of technical data sets with regard to the applicable configuration of the system. Changes involve considerable logistical and financial expenditure. The manual procedure involves a relatively high potential for error, for example, if invalid technical data sets were used.

International Patent Disclosure WO 2002/077732 discloses a management system for documents. The management system may include an automation system for various equipment. The management system does not furnish technical data sets for performing maintenance tasks and does not solve the problem of dynamically configurable components.

SUMMARY

The present embodiments may obviate one or more of the drawbacks or limitations inherent in the related art. For example, in one embodiment, an automatic method for controlling the furnishing of technical data sets for performing maintenance processes in large-scale technical systems is provided.

In one embodiment, a control system may include a technical system and a management system. The management system may include a memory that stores technical data sets for all the configurations of the system and/or technical data sets that are necessary for performing maintenance processes of the technical system. The technical system may include a local document server and a local configuration database. The local document server may include technical data sets with regard to the corresponding configuration of the system. The local configuration database may include the components of the system and the attributes necessary for controlling the technical data sets.

In one embodiment, a method may include transferring a report from a configuration database to a central management system based on a change of at least one configurable components of the system, or a change of one of the technical data sets, wherein the report includes a request to update the technical data sets with respect to the change; determining an updated technical data set based on the report and a set of rules stored in a memory of the management system; and forwarding the updated technical data set to the local document server.

"Technical data sets" may be in the form of separate documents that are in configurable formats. Technical data sets may include system-specific and/or component-specific data sets that are necessary for performing maintenance processes. Technical data sets include configuration-dependent data, which is subject to updating. The scope, size, format, and/or contents of the document may be variable. For example, the technical data set may include an XML document. Alternatively, the technical data sets may include data in a Word format, a PDF format, or other suitable formats.

A maintenance task or maintenance process includes at least one task that is necessary in the context of monitoring, control and/or maintenance of the operation of a large-scale technical system. Any changes in configuration may be converted directly and taken into account in the maintenance task.

In one embodiment, the management system includes a central server, which may be furnished at the same location as the technical system and/or individual components of the system. Alternatively, the management system may be disposed in a remote location from the technical system and be in data exchange with the technical system via a suitable communications connection. The management system is typically furnished at the system control headquarters. In one embodiment, an asset or configuration management database known in the prior art may be employed.

In one embodiment, the technical system includes the document server. Alternatively, the document server is deposed remotely from the technical system and is in data exchange with it. The document server may include a memory. The document server memory is operable is able to store the technical data sets that are relevant for the particular technical system and for its components. The document server may be system-specific and/or component-specific.

In one embodiment, the configuration database includes an asset or configuration management database. The configuration database may include all the components of the applicable technical system. An association among the various components and the information, data sets and/or attributes that are necessary for the control may also be stored in memory.

In one embodiment, the system components, the local data server, and/or the configuration database of the system are in data exchange.

Data may be exchanged between the technical system and the central management system via a communications connection, for example, via the Internet, a dedicated line, a radio connection, or the like.

In one embodiment, each step of updating the technical data set is automatically determined or carried out. The cost of updating the technical data sets of the technical system is reduced in comparison to the related art. No manual activity is needed to update the technical data sets, which allows documentation and/or production of updated technical data sets to be furnished substantially faster than the related art. However, in an alternative embodiment, at least individual steps updating the technical data sets may be done semiautomatically, giving the user control over different acts of the method.

The relevant technical data sets are automatically allocated to the particular system configuration. Errors may be reduced or avoided. The quality of the maintenance processes may be improved.

In one embodiment, the most current technical data sets, for example, the most recently updated version of the technical data sets, are always and directly available to the technical system.

In one embodiment, upon installation of a technical system, the technical documentation is automatically adapted to the particular current version, for example, the current installation status. The technical data sets necessary for the startup are automatically made available on the local server. The technical data sets may automatically grow in size over the life of the system.

In one embodiment, changes with respect to the technical data sets, the technical system, its components, or the configurations of the components are taken into account automatically and at the earliest possible time. The changes affect only those components of the system that are affected by the changes. The other components, on which the change has no effect, remain unchanged. Unnecessary transmission of unchanged data sets may be avoided.

The changes of a component of the technical system may include adding components, changing and/or replacing previous components, and changes that pertain to the configuration of the same component.

In one embodiment, each technical data set and/or each version of a technical data set includes a unique identification signal. The unique identification signal may be mathematically different than other identification signals. Using the identification signal, each individual version of a technical data set may be separately called up.

In one embodiment, the configuration database may include attributes that are stored in memory. The attributes may be allocated to a particular component and pertain, for example, to a matter number, the particular revision, a possible variant of the components added, and/or the components.

In one embodiment, a report is sent from the technical system to the central management system when a change affecting the system has been detected. The report includes a request for updating the technical data. The report may be sent as soon as the change has been detected.

In one embodiment, the central management system includes a control unit stored in memory. The control unit finds the relevant data set as fast as possible and in an optimized way. The control unit may also monitor an authorization, a time stamp, and/or other conditions. The control unit processes the report taking the contents of the particular report into account. The control unit determines a relevant technical data set. The relevant technical data set is forwarded directly to the local document server.

The forwarding may be triggered in part either by the local document server or by the management system. For example, forwarding my be triggered when the local document server requests the technical data set or the management system actively trips the sending of the technical data set to the local document server.

In one embodiment, a new (updated) technical data set that is sent to the local document server may be allocated an identifier. The identifier makes it possible for the new technical data set to be accessed directly by the maintenance staff. In an alternative embodiment, instead of using the identifier, a reference to the new technical data set may be used in the local document server.

In one embodiment, the updating of maintenance data is tripped by a change in the technical system or in a component affecting the system. The change may take place locally, on-site, in the system and thereupon the associated maintenance data were updated or adapted in the central management system. Updating of the maintenance data may also be tripped by a central change in the technical data sets. For example, in the case of a revision change, the documentation relating to a system or a component may be changed centrally (for example at headquarters). The updated technical data sets may be distributed automatically only to the relevant systems or components, namely those affected by the change. The updated data sets are not distributed to those components of the system that are not affected by the change and are not relevant. An update in relevant service documentation may be done in a site-specific and/or configuration-specific way.

The above-described embodiments of the method of updating the technical data sets may be embodied as a computer program product or on computer readable media. For example, a computer may perform the above-described method, and its program code is executed by a processor.

In one embodiment, a storage medium stores the above-described, computer-implemented method. The storage medium is readable by a computer.

It is furthermore possible for individual components of the above-described method to be embodied in a saleable unit, and for the remaining components to be embodied in a different saleable unit, for example, in the form of a distributed system.

BRIEF DESCRIPTION OF THE DRAWINGS

FIG. 1 is one embodiment of a control system and method for updating technical data sets.

DETAILED DESCRIPTION

In one embodiment, as shown in FIG. 1, a system A may include a plurality of different and separately, dynamically configurable components K. Changes in the configuration of a component K may result, for example, from a changed hardware module, the replacement of a hardware module, system expansions, or software updates. In one embodiment, the changes in configuration are automatically taken into account in the performance of a maintenance process.

System A may include a local document server DS and a configuration database KDB.

In one embodiment, the local document server DS may include a memory. The technical data sets that are relevant to the particular system A may be stored in the memory. The technical data sets, for example, the technical documentation, are always present in the most current version on the local document server DS and thus corresponds to the specific system configuration via a closed process loop. Each of the components K, which are present in the system A, are included in the configuration database KDB and provided with the attributes necessary to control the documentation. In one embodiment, the configuration database KDB is formed of a local configuration management or asset database. Attributes may include, for example, the matter number and the revision of the current configuration change and/or a variant of the current configuration change.

When a change occurs in a component K, for example, from a configuration change or a new addition of a component, a report is sent from the configuration management database or from the asset database to a central document management system MS. The report may include a request to update the technical data set with respect to the particular system A.

There are various possibilities for how the report is embodied. The report may include an arbitrary message in an arbitrarily configurable format. Alternatively, the report may include a single signal that is sent to the management system MS. The report may include all the data necessary for the automatic document control. The report may be evaluated using the rules that are stored in memory in the management system MS. When the report is evaluated, the technical data set relevant to the particular configuration change is automatically forwarded by the management system MS to the local document server DS.

In one embodiment, system A includes a user interface. Maintenance workers can see directly, via the user interface, which technical data sets relating to a certain configuration of the system A can be furnished in that system. The use of different versions of technical data sets may be tracked. For example, workers may track which versions of technical data sets have already been used. System A provides direct access to the required technical documents. The various (different) versions of the technical data sets, which correspond to the various configurations, may be stored in a memory centrally in the management system MS. The various (different) versions of the technical data sets may be stored for a defined period of time. A central administration may be handled for revision statuses of all systems A in an arbitrary geographic area.

It should be pointed out that the description of the exemplary embodiments must be understood in principle not to be limiting with regard to a particular physical realization of the invention. For example, for one skilled in this particular art, it is understood that the invention can be realized partially or entirely in the form of software and/or hardware and/or can be distributed over a plurality of physical products—including computer program products in particular. Though FIG. 1 only depicts one system A, one skilled in the art would understand, as discussed above, that a plurality of systems A may be used.

The invention claimed is:

1. A method for controlling a technical data set for performing a maintenance process in a technical system that includes a plurality of configurable components, the method comprising:

providing a central management system that includes a memory that is operable to store technical data sets that perform maintenance processes;

providing a local document server in the technical system, the local document server being operable to retrieve the technical data sets with respect to an applicable system in an arbitrary configuration;

providing a local configuration database of the plurality of configurable components of the technical system and attributes for control of a respective component;

transferring a report from the local configuration database to the central management system based on a change of at least one configurable component of the plurality, or a change of one of the technical data sets, wherein the report includes a request to update the technical data sets with respect to the change;

automatically determining an updated technical data set based on the report and a set of rules stored in the memory of the central management system; and automatically forwarding the updated technical data set to the local document server, wherein the report including the request to update the technical data sets is transferred from the local configuration database to the central management system when an addition of another configurable component to the technical system or a change, replacement or change in configuration of the at least one configurable component of the plurality is detected.

2. The method as defined by claim 1, wherein transferring a report from the configuration database to the central management system includes exchanging the report from the technical system to the central management system via a communications connection.

3. The method as defined by claim 1, wherein each of the technical data sets and/or each version of a technical data set is assigned a unique identification signal.

4. The method as defined by claim 1, wherein the attributes that are allocated to the respective component and that are stored in memory in the local configuration database include a reference to the updated technical data set or an identification signal that uniquely refers to a version of the technical data set.

5. The method as defined by claim 1, wherein the technical system is automatically updated with the updated technical data set.

6. The method as defined by claim 1, wherein the forwarding of the updated technical data set is tripped by the central management system or the local document server.

7. The method as defined by claim 1, wherein determining the updated technical data set includes generating the updated technical data set based on a current configuration of the technical system.

8. The method as defined by claim 7, wherein generating the updated technical data set is based on a current configuration of one configurable component of the plurality of the technical system.

9. The method as defined by claim 1, comprising: forwarding a central change in at least a part of the technical data set to the technical system, and/or configurable components of the plurality that are affected by the central change.

10. The method as defined by claim 1, wherein forwarding the updated technical data set to the local document server includes exchanging the updated technical data set from the central management system to the technical system via a communications connection.

11. A control system that updates technical data sets that perform a maintenance process in a technical system, the control system comprising:
- the technical system including a plurality of configurable components; and
- a central management system that includes a memory that is operable to store technical data sets for configurations of the technical system and a set of rules,
- wherein the technical system includes a local configuration database and a local document server, the local document server including a memory that is operable to store and communicate technical data sets that correspond to a present configuration of the system, the local configuration database including an allocation module that is operable to allocate attributes of a configuration that are necessary for a control of a configurable component of the plurality, and a reporting unit that is operable to send a report to the central management system,
- wherein the central management system is configured to automatically determine technical data sets that correspond to the present configuration of the technical system based on the report and the set of rules stored in the memory of the central management system, and
- wherein the report includes a request to update the technical data sets and is sent from the reporting unit of the local configuration database to the central management system when an addition of another configurable component to the technical system, or a change, replacement or change in configuration of at least one configurable component of the plurality is detected.

12. The control system according to claim 11, wherein the memory of the central management system is operable to store a rule database that includes a plurality of sets of rules and is operable to automatically determine a most recently updated version of a technical data set based on the report sent from the technical system.

13. The control system according to claim 11, comprising a plurality of technical systems.

14. A method for updating a technical data set in a technical system that includes at least one configurable component, the method comprising:
- transferring a report from a configuration database disposed in the technical system to a central management system;
- automatically processing the report in the central management system to determine an updated technical data set based on the report and a set of rules stored in a memory of the central management system; and
- communicating the updated technical data set from the central management system to a document server disposed in the technical system,
- wherein the report includes a request to update the technical data set and is transferred from the configuration database to the central management system when an addition of another configurable component to the technical system or a change, replacement or change in configuration of the at least one configurable component is detected.

15. The method according to 14, wherein the report is transferred as a function of current technical data sets.

16. The method according to 14, wherein the updated technical data set is automatically determined based on the report.

* * * * *